May 23, 1961 H. G. MASON 2,985,403
MOLDED CHEESE CORE

Filed March 19, 1959 2 Sheets-Sheet 1

INVENTOR.
HARRISON G. MASON
BY *Wolfe, Hubbard,*
*Voit & Osann*
ATTORNEYS

May 23, 1961 H. G. MASON 2,985,403
MOLDED CHEESE CORE
Filed March 19, 1959 2 Sheets-Sheet 2
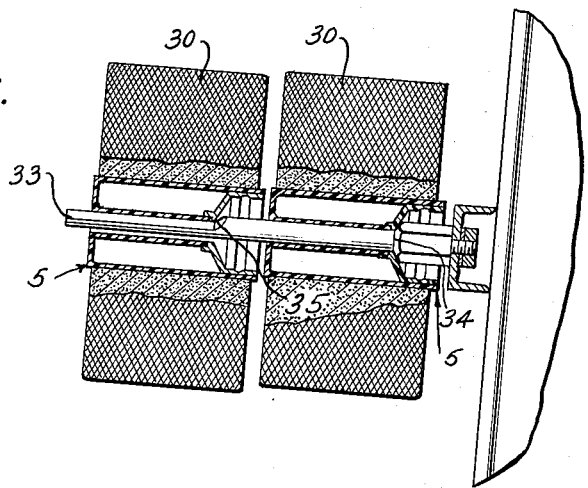
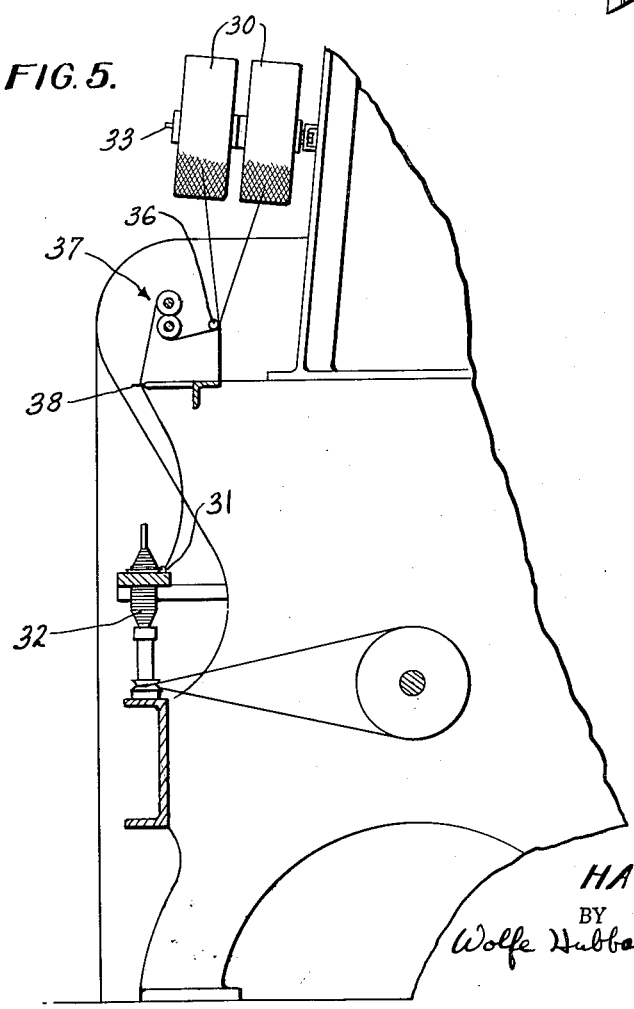
INVENTOR.
HARRISON G. MASON
BY
Wolfe Hubbard Voit & Osann
ATTORNEYS

United States Patent Office 2,985,403
Patented May 23, 1961

2,985,403
MOLDED CHEESE CORE

Harrison G. Mason, Winnebago, Ill., assignor to Barber-Colman Company, Rockford, Ill., a corporation of Illinois Filed Mar. 19, 1959, Ser. No. 800,419

1 Claim. (Cl. 242—118.32)

This invention relates to a core adapted to be detachably mounted on a rotatable spindle by which the core is supported during winding of thread thereon to form a large yarn package such as a cheese. The spindle usually projects from a head having an annular series of ball detents spring urged outwardly into an internal peripheral groove in the core to lock the latter detachably in a precisely fixed axial position relative to an arm by which the head and the spindle are supported during winding of the cheese. Heretofore, such cheese cores have been made of a single piece of wood by a series of turning operations thus making it difficult to maintain close tolerances at the critical dimensions in high speed production manufacture.

The primary object of the invention is to construct the core in a novel manner from molded plastic so that the cores are uniform when made by production methods with their critical dimensions held to close tolerances while at the same time providing a core which is considerably cheaper than prior cores.

A more detailed object is to make the core from two molded parts which are assembled simply by telescoping one within the other and which, when thus assembled, locate the core periphery precisely concentric with the spindle axis and accurately position the core axially relative to the supporting arm and head.

Other objects and advantages of the invention will become more apparent from the following detailed description taken in connection with the accompanying drawings, in which Figure 1 is a fragmentary longitudinal sectional view of the improved cheese core mounted on a winding spindle.

Fig. 5 is a fragmentary view of a twister creel using the improved cheese core.

Fig. 6 is a fragmentary diametric section of a cheese and its creel mounting.

Figure 1:
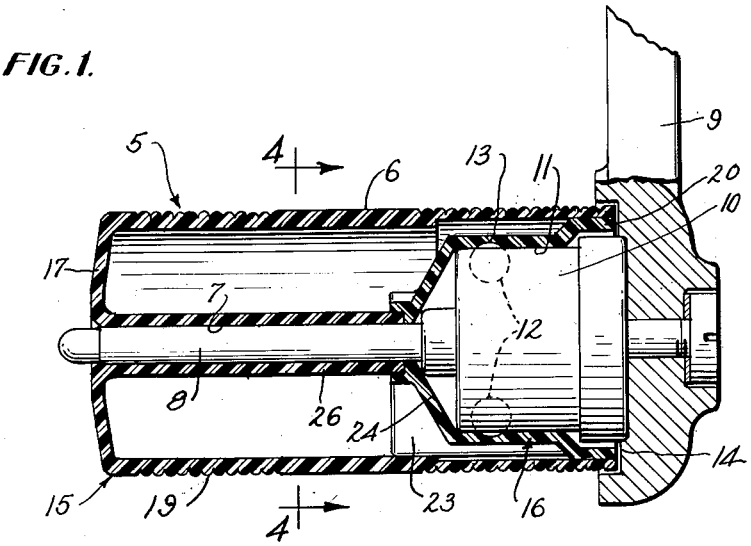
Figure 2:
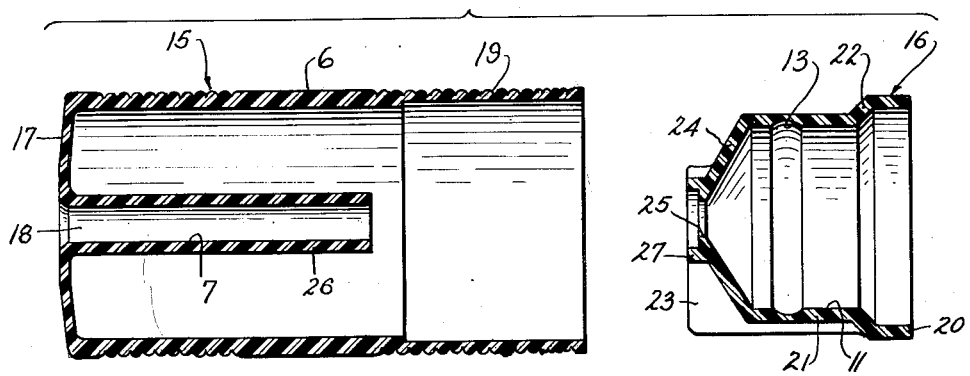
Fig. 2 is an exploded longitudinal sectional view of the molded parts which make up the core.
Figure 3:
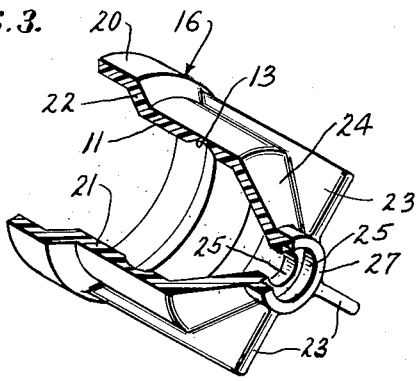
Fig. 3 is a perspective view of the inner part of the core with a portion broken away and shown in section.
Figure 4:
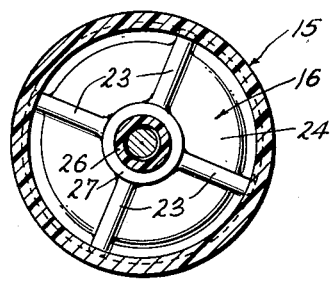
Fig. 4 is a sectional view taken along the line 4—4 in Fig. 1.

As in prior constructions, the improved core 5 provides an external cylindrical surface 6 upon which the thread is wound and a bore 7 extending along the axis of the core and receiving a spindle 8. The latter is rotatably supported on a suitable arm 9 through the medium of a bearing structure or head 10 which is attached to the arm and projects into a recess 11 in the adjacent end of the core. With the core thus telescoped onto the spindle, ball detents 12 mounted on the head 10 are pressed outwardly and seated in a groove 13 extending around the wall of the recess 11 to locate the core axially and to hold the core on the spindle. In this position, the inner end of the core projects into an annular groove 14 in the side of the arm, there being only a small clearance between the two to prevent foreign matter such as lint and thread ends from entering the bearing structure 10.

In a number of respects, the dimensions of the core 5 are quite critical. For example, it is important that the bore 7 be precisely concentric with the surface 6 since any eccentricity is likely to cause objectionable vibrations during the winding operation. Also, the axial distance between the groove 13 and the inner end of the core is critical since the detents 12 must seat fully in the groove. Similarly, the diameters of the bore 7 and recess 11 must be precise if the core is to fit snugly on the spindle 8 and the head 10 and the outside diameter of the core must be held to close tolerances in view of the small clearance at the groove 14.

Prior cores have been made from a solid piece of wood with the bore 7 drilled through and the recess 11 bored out at one end. This requires a succession of turning operations which are expensive and which are difficult to perform with the necessary accuracy under conditions of high speed production. Moreover, wood expands and contracts with changes in temperature and humidity whereby the critical dimensions do not remain constant during service use.

The present invention aims to overcome the difficulties encountered with wood by making the core in a novel manner from plastic so that the core may be made by molding and still be precisely dimensioned. To this end, the core is made in two parts 15 and 16 which are molded individually and then telescoped one within the other. When thus assembled, the various diameters and axial lengths bear a precise and constant relationship to each other.

As shown in the drawings, the part 15 is a cylindrical shell with one end open and the other end closed by a wall 17. A hole 18 formed in the latter is concentric with the axis of the shell and corresponds in diameter to the size of the bore 7. The usual ribbing 19 is formed on the outer periphery of the shell.

The other part 16 telescopes within the open end portion of the shell 15 and herein is a unitary member in the form of a hollow cylinder having a cylindrical end flange 20 connected to the main body 21 of the cylinder by an intermediate portion 22 so that the inside of this member defines the recess 11. In diameter, the flange 20 substantially equals the inside diameter of the shell to fit snugly within the latter while the body 21 of the cylinder 16 is smaller. Ribs 23, which may be integral with the shell but herein are part of the cylinder, angularly spaced around the outside of the cylinder and extending from the flange 20 to the inner end of the cylinder also fit snugly against the inside of the shell to reenforce the body portion of the cylinder and to locate the latter precisely concentric with the shell. An integral wall 24 closes the inner end of the cylinder 16 and is formed with a central hole 25 which, like the hole 18, is concentric with the axis of the core.

To define the bore 7, a tube 26 extends along the axis of the core from the wall 17 to the wall 24 and connects the holes 18 and 25. While the tube may be made either as a part of the shell 15 or as a part of the cylindrical inner member 16, it is shown in the drawings molded integrally with the shell and projecting axially inwardly from the end wall 17 of the shell. In such a case, a short cylindrical flange 27 projects axially from the wall 24 around the hole 25 to receive the end of the tube 26 and hold the latter accurately concentric with the shell 15.

As shown in the drawings, the groove 13 for receiving the ball detents 12 is formed in the inside surface of the cylinder 16. This is achieved without special molding problems by taking advantage of the thin section of the cylinder and the pliable nature of the plastic before it has set. Thus, the member 16 is molded on a unitary die (not shown) and, while the plastic is still warm and pliable, the member is peeled off the die, the member flexing radially to permit such peeling. Immediately after it has been stripped off from the die, the cylindrical member is inserted in the shell 15 so that it fits snugly and accurately within the latter. If desired, the outer surfaces of the flange 20 and the ribs 23 and the inner surface of the flange 27 may be coated with a solvent before the cylinder is inserted in the shell so that the two parts are bonded together.

The core constructed as above described and mounted as shown in Fig. 1 is used in a so-called spooler by which thread is wound onto the core to form a cheese 30 (Figs. 5 and 6). Such cheeses are mounted in a so-called twister creel shown in Fig. 5 and Patent 2,509,333, by which the threads of two cheeses are twisted together by a traveler ring 31 and wound onto a rotating bobbin 32. The cores of the two cheeses are telescoped loosely and arranged end to end on an inclined pin or spindle 33 with the inner ends resting against shoulders 34 and 35. The spindle is made of steel and its supporting surfaces which contact the wall of the bores 7 in the cores are ground and polished. The threads led tangentially off from the peripheries of the two cheeses pass around a guide bar 35 and then around and between power rotated feed rolls 37 and through a guide 38 to the traveler ring 31.

The danger of thread breakage during unwinding in the manner above described is eliminated by employing a plastic material possessing a unique combination of several physical properties, some of which are normally unused. Among these are the properties mentioned above including the flowability during setting of the plastic and high dimensional stability under the widely varying conditions of temperature and humidity likely to be encountered in a textile mill. By maintaining the critical dimensions mentioned above as well as the concentricity of the core, it is possible to eliminate the winding imperfections and the so-called hard or soft spots frequently produced in the winding of cheeses on cores made from hard maple, the only material heretofore found to be suitable for use in handling fine threads in twister creels. Among other desirable properties of the molding material are lightness and high impact strength to facilitate and withstand the rough handling encountered in service usee in a textile mill.

Other desirable and normally unused properties of plastic material are dictated by the conditions existing during unwinding of the cheese in a twister creel as described above. The spindle 33 must offer sufficient resistance to turning of the cheese to prevent overrunning and yet not restrain the turning enough to cause breakage during the unwinding of fine thread. For this purpose, the surface of the bore 7 should be smooth and possess a coefficient of friction approximately that of the hard maple above referred to.

At the same time, the frictional force resisting turning of the cheese on its supporting pin must remain substantial during prolonged service use. That is to say, the resin must be non-abrasive and not wear away substantially so as to cause the friction force due to contact between the spindle and bore surfaces to increase appreciably. Phenolic resins such as Bakelite do not possess this latter property and are unsuited for use as a core material. Of the plastic materials now available, the unique combination of the desired physical properties set forth above is possessed by those sold under the trade names of Nylon, Teflon and Cycolac. Because of its lower cost, Cycolac known as T-grade is preferred, this being a product of Marbon Chemical.

I claim as my invention:

A cheese core for mounting on a rotary winding spindle comprising an outer generally cylindrical shell, a wall rigid with and closing one end of said shell and having a central axial opening, a tube rigid at one end with said wall and extending partially through said shell so as to fit over the free end of said spindle, and a separate hollow member of molded plastic pressed into the other end of said shell and including a cylindrical end flange snugly fitting within said shell end, an inner end of reduced diameter telescoping with and supporting the inner end of said tube, and an intermediate cylindrical portion of smaller diameter than said flange and larger than said inner end joining said flange and inner end and having angularly spaced external ribs fitting snugly within said shell and an internal groove formed around its internal periphery for receiving a locking detent on said winding spindle, said cylindrical portion having a wall thickness sufficiently small to flex radially and permit axial withdrawal of said hollow member off from a die after molding of the member and without destroying the contour of said groove.

References Cited in the file of this patent

UNITED STATES PATENTS

| 1,805,495 | McKean | May 19, 1931 |
| 2,551,462 | Potts | May 1, 1951 |
| 2,721,043 | Meretey | Oct. 18, 1955 |
| 2,879,010 | Crawford | Mar. 24, 1959 |
| 2,887,842 | Cocker | May 26, 1959 |

FOREIGN PATENTS

| 700,752 | Great Britain | Dec. 9, 1953 |